N. K. PSACHOS.
MANIFOLD.
APPLICATION FILED SEPT. 22, 1919.

1,364,310. Patented Jan. 4, 1921.

Witnesses:
Mary Kennedy
Thomas Wilson

Inventor
Nicholas K. Psachos
By John C. Alexander
Attorney

UNITED STATES PATENT OFFICE.

NICHOLAS K. PSACHOS, OF DETROIT, MICHIGAN.

MANIFOLD.

1,364,310.  Specification of Letters Patent.  Patented Jan. 4, 1921.

Application filed September 22, 1919. Serial No. 325,414.

*To all whom it may concern:*

Be it known that I, NICHOLAS K. PSACHOS, a citizen of the United States, residing at Detroit, in the county of Wayne and State of Michigan, have invented certain new and useful Improvements in Manifolds, of which the following is a specification.

My invention relates to intake and exhaust manifolds combined and is here shown adapted to a four cylinder type of engine, the illustration being of the four cylinder Ford engine.

The object is to produce a form of intake and exhaust manifold combined, where a mixture of the desired temperature will be admitted to the combustion chambers, the mixture being heated by the exhaust gases before it enters the combustion chambers.

A further object is to produce a device which will automatically regulate the admission of mixture to the engine in direct ratio to the engine speed.

A further object is to produce a device which will so regulate the flow of mixture to the engine that at the lower running speeds, a smaller quantity of mixture will be admitted to the combustion chambers than if a free and clear passageway were left between the carbureter and the inlet ports to the combustion chambers.

Figure 1:
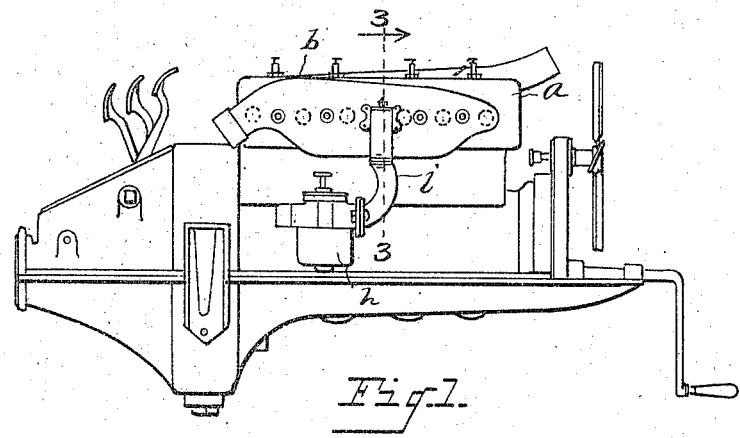
Figure 1 is an elevation showing my device attached to an engine of conventional design.
Figure 2:
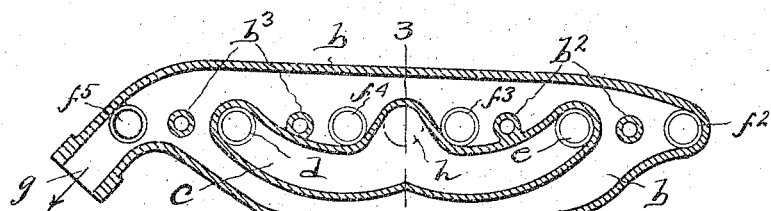
Fig. 2 is a sectional view of the combined intake and exhaust manifold.
Figure 3:
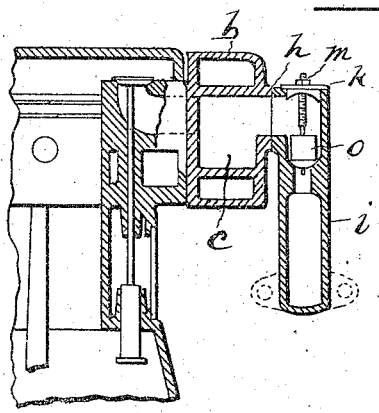
Fig. 3 is a section taken on line 3—3 of Figs. 1 and 2.
Figure 5:
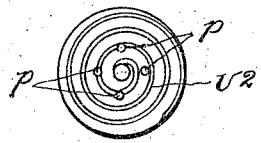
Fig. 5 is a plan view of the valve head from below.
Figure 4:
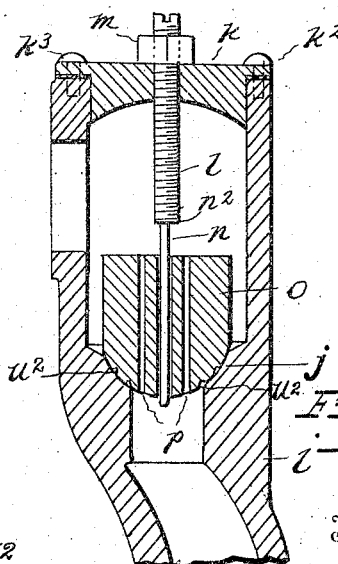
Fig. 4 is an enlarged sectional view taken at right angles to the views of Fig. 3 and along the longitudinal center of the valve stem.

In the drawings $a$ represents a conventional type of internal combustion engine to which is attached casing $b$ which comprises the exhaust manifold and serves as a surrounding casing for the intake manifold $c$. Casing $b$ is fastened to the engine by means of bolts or otherwise connected as at $b^2$ and $b^3$. The fuel intake pipes leading from the main casing of the intake manifold are indicated as $d$ and $e$. The exhaust ports are indicated as $f^2$, $f^3$, $f^4$ and $f^5$. The exhaust gases from the combustion chambers which enter the exhaust through the four exhaust outlet ports above mentioned escape therefrom through open port $g$ and are conducted away in the approved manner.

The carbureter is indicated at $h$, and the fuel inlet pipe leading from the carbureter to the intake manifold is indicated at $i$. This inlet pipe $i$ is provided with a restriction as shown at its upper extremity which makes a valve seating for a check valve of hereinafter described construction. The upper end of this connection means $i$, is provided with a closure $k$, held in place as indicated at $k^2$ and $k^3$.

Projecting coaxially through said closure is a valve stem $l$, threaded at its upper end to receive adjusting nut $m$. This valve stem may be raised or lowered by actuating the said adjusting nut $m$, for purposes hereinafter set forth.

The valve stem $l$, terminates at its lower extremity in a coaxial longitudinal extension $n$, of reduced diameter.

Loosely carried on said reduced extension $n$, is a check valve head $o$, provided with a central longitudinal passageway through which said extension $n$ passes; said head $o$, being adapted for free longitudinal movement on said reduced stem, limited only as to distance of valve travel by the ledge $n^2$. This limit of distance of valve travel is adjustable by means of adjusting nut $m$, through which the distance of the ledge $n^2$ from the valve seat may be decreased or increased.

The valve head $o$, is formed with a pronounced convex lower exterior to fit the valve seat $j$. Longitudinal passageways therethrough are provided as indicated at $p$ and in such number as may be desired, four being here shown. The convex exterior of said valve surface which rests in the valve seat is cut with a spiral groove $u^2$. This spiral groove is shown commencing near the outer circumference and with a right-hand turn proceeding inward.

The operation of the device is as follows:

At the lower running speeds of the engine the amount of mixture permitted to pass through the intake pipe to the distributing ports of the manifold is limited by the intercepting position of the valve head. As the engine speed increases however, the suction increases and more fuel mixture is drawn through the intake and the constantly increasing flow of mixture lifts the valve head on its coaxial stem and the fuel mixture rushes through around the valve head o. The extent of passageway provided constantly increases in direct proportion to the speed of the engine.

In addition to the automatic regulation of the intake of fuel, the force exerted upon the longitudinally movable valve head imparts a rotary movement thereto and a swirling agitation is set up in the fuel mixture more thoroughly mixing the gas and air of the fuel mixture. This action is naturally augmented by the action of the spiral groove on the seating surface of the valve head and by the escape of the fuel mixture through the longitudinal passageways of a rapidly revolving valve head.

The spiral groove which is formed on the lower part of the valve head acts as a reservoir for the last charge. It allows said charge to settle in said curve instead of falling back to the carbureter or in the cylinder. This enables the engine to get away to a quick start in cold weather.

Having described my invention, I claim as follows:

1. In an intake manifold, an inlet pipe provided with a restriction, a stationary valve stem projecting from above coaxially therein, a valve head adapted to seat in the mouth of said restriction freely mounted on said stem for longitudinal movement thereon, a series of passageways through said head longitudinally of the inlet pipe, means for limiting the distance of valve travel of said valve head.

2. In an intake manifold, an inlet pipe provided with a passageway bell shaped at the upper end of said inlet pipe, a stationary valve stem projecting coaxially downward therein, a valve head freely mounted on said stem for longitudinal movement thereon, and adapted to seat in the bell mouth of said passageway through the inlet pipe, means on said stem for limiting the distance of valve travel, adjusting means for regulating the maximum limit of travel, a series of passageways through said valve head longitudinally of the inlet pipe.

3. In an intake manifold, an inlet pipe, a restriction in the passageway at the upper end of said inlet pipe, a stationary valve stem projecting coaxially downward therein, a valve head provided with a coaxial longitudinal passageway to receive said valve stem and adapted for free movement thereon, a series of passageways through said valve head parallel to said coaxial passageway receiving the valve stem, a convoluted groove on the valve seating surface of said valve head.

4. In an intake manifold, an exhaust casing surrounding said intake manifold casing, so that the intake manifold casing will be heated by the passage of the exhaust gases over the surface thereof, an inlet pipe to said intake manifold casing, the bell mouth passageway of which is adapted to serve as a valve seat, a stationary valve stem projecting downwardly coaxially into said bell mouth opening, a valve head seated in said valve seat, and mounted on said valve stem for longitudinal movement thereon, and adapted to be held in place by the force of gravity, a ledge on said valve stem for limiting the distance of valve travel of said valve head, means for raising and lowering said valve stem to increase or diminish the distance of valve travel.

5. In an intake manifold, an inlet pipe provided with a passageway therethrough contracted near its upper end, but flaring into the bell mouth exit, a stationary valve stem projecting coaxially downward therein, a valve head freely mounted on said stem for longitudinal movement thereon adapted to seat in said bell mouth, a series of passageways through said valve head longitudinally of the inlet pipe, means for limiting and means for regulating the distance of valve travel, a gas reservoir recess in the seating surface of said valve head to retain charge of gas.

NICHOLAS K. PSACHOS.

Witnesses:
THOMAS WILSON,
MARY KENNEDY.